3,654,225
PROCESS FOR THE PREPARATION OF POLYETHYLENE 1,2 - DIPHENOXYETHANE-4,4'-DICARBOXYLATE USING A MANGANESE COMPOUND AS AN ESTER INTERCHANGE CATALYST AND AMORPHOUS GERMANIUM DIOXIDE AS A CONDENSATION CATALYST
Hidehiko Kobayashi and Kiichiro Sasaguri, Tokyo, Hiroshi Komoto, Saitama, and Sukeo Kawashima, Tokyo, Japan, assignors to Asahi Kasei Kogyo Kabushiki Kaisha, Kita-ku, Osaka, Japan
No Drawing. Filed May 26, 1969, Ser. No. 827,990
Claims priority, application Japan, June 1, 1968, 43/37,135
Int. Cl. C08g 17/013, 17/015
U.S. Cl. 260—47 C       4 Claims

ABSTRACT OF THE DISCLOSURE

This invention discloses a process for the preparation of polyethylene 1,2 - diphenoxyethane - 4,4' - dicarboxylate which comprises reacting 1,2 - bis(p - carbomethoxyphenoxy) ethane with ethylene glycol in the presence of a manganese compound to effect an ester interchange reaction, said 1,2 - bis(p - carbomethoxyphenoxy) ethane being purified to have an acid value of 0.03 or less, subsequently adding a phosphorus compound to the reaction system to extinguish the polymerization catalytic activity of said manganese compound while controlling the concentration of ethylene glycol in the reaction system to 40% by weight or less, and thereafter effecting a polycondensation reaction in the presence of amorphous germanium dioxide. In accordance with the present invention, there can be obtained polyethylene; 1, 2-diphenoxyethane - 4,4' - dicarboxylate which is excellent in whiteness, transparency and thermal stability and low in crystallization velocity, and which is free from coloration when molded or spun and heated.

This invention relates to a process for the preparation of linear polyethylene 1,2 - diphenoxyethane - 4,4' - dicarboxylate. More particularly this invention relates to a process for the preparation of polyethylene 1,2' - diphenoxyethane - 4,4' - dicarboxylate which comprises reacting 1,2 - bis(p - carbomethoxyphenoxy) ethane with ethylene glycol in the presence of a manganese compound to effect an ester interchange reaction, said 1,2 - bis(p-carbomethoxyphenoxy) ethane being purified to have an acid value of 0.03 or less, subsequently adding a phosphorus compound to the reaction system to extinguish the polymerization catalytic activity of said manganese compound while controlling the concentration of ethylene glycol in the reaction system to 40% by weight or less, and thereafter effecting a polycondensation reaction in the presence of amorphous germanium dioxide.

It is an object of the present invention to provide a process for the preparation of polyethylene 1,2-diphenoxyethane - 4,4' - dicarboxylate which is excellent in whiteness, transparency and thermal stability and low in crystallization velocity, and which is free from coloration when molded or spun and heated.

It has been well known that a molded article of polyethylene 1,2 - diphenoxyethane - 4,4' - dicarboxylate has a high initial Young's modulus, excellent resistance to hydrolysis by alkali, good dimension stability and high crystallization velocity, as compared with a molded article of polyethylene terephthalate. However, such polyethylene 1,2 - diphenoxyethane - 4,4' - dicarboxylate as conventionally known in the film field have drawbacks such as poor transparency or poor workability even when good in transparency.

Heretofore, as to a process for improving the workability of the transparent film of polyethylene terephthalate, there have been known several methods, such as method for incorporating an organic substance thereinto during the course of extrusion for making a film, coating an organic substance onto the surface of film, dispersing therein an inorganic substance such as $SiO_2$ during the course of polycondensation reaction or during the course of making a film, or coating onto the surface of film a dispersion of an inorganic granular substance in a suitable dispersing agent. However, the application of the above-mentioned methods to polyethylene 1,2-diphenoxyethane - 4,4' - dicarboxylate is accompanied by various adverse effects. For example, it will result in decomposition of the additive, thus causing the coloration of the film. Moreover, the possible unevenness in the coating and the possible scattering of light cause the transparency of the film to be remarkedly deteriorated.

In the textile field also, the conventionally prepared polyethylene 1,2 - diphenoxyethane - 4,4' - dicarboxylate has several drawbacks. For example, when the polyethylene 1,2 - diphenoxyethane - 4,4' - dicarboxylate is subjected to a hot drawing by an ordinary method after spinning, it will crystallize before drawing because of its high crystallization velocity, thus causing devitrification. This devitrification leads to lowering of the tenacity of the product fibre. In order to eliminate these drawbacks, it has conventionally been proposed to effect copolymerization thereof with another aromatic dicarboxylic acid alkyl ester such as dimethyl terephthalate, so that the crystallization velocity is depressed. However, while such copolymerization is effective for improving the elongation it will always result in the loss of the aforementioned excellent properties inherent to polyethylene 1,2-diphenoxyethane-4,4'-dicarboxylate.

On the other hand, the present inventors have found that polyethylene 1,2 - diphenoxyethane - 4,4' - dicarboxylate does, because of the ether linkage present therein, exhibit an utterly different behavior with regard to thermal decomposition, as compared with polyethylene terephthalate. For example, although an antimony compound such as antimony trioxide is recognized in the art as the best polymerization catalyst for manufacturing polyethylene terephthalate, it has been found that the use of such catalyst in the manufacture of polyethylene 1,2 - diphenoxyethane - 4,4' - dicarboxylate will, even if various stabilizers are used jointly, result in the product having poor thermal stability.

Polyethylene 1,2-diphenoxyethane - 4,4' - dicarboxylate is a high class of polyester in the field of plastics, textile fibres and films, since it is capable of easily forming a high molecular weight polymer, and a molded article obtained therefrom has a high Young's modulus and a high dimersion stability.

Heretofore, it has been known that polyethylene terephthalate is prepared by first ester interchanging a glycol and a lower alkyl ester of an aromatic dicarboxylic acid using as a catalyst a manganese compound soluble in the reaction system to form bis ($\beta$-hydroxyalkyl) terephthalate and thereafter polycondensing the resulting ester interchange reaction product at elevated temperature under reduced pressure. It is described in, for example, Japanese patent publication No. 4,146/1956 that a manganese compound singly employed exhibits an excellent activity as a catalyst in an ester interchange reaction as well as polycondensation reaction. However, it has been found by the inventors that polyethylene 1,2-diphenoxyethane-4,4' - dicarboxylate, which is produced by the polycondensation reaction of the ester interchange reaction product obtained by effecting an ester interchange reaction using as a catalyst a manganese compound in accordance with the ordinary procedure, is poor in whiteness as well as thermal stability.

Therefore, in order to overcome the drawbacks as mentioned above, the present inventors have made an intensive investigation on the possibility of the preparation of polyethylene 1,2 - diphenoxyethane-4,4'-dicarboxylate by employing a method wherein the polymerization catalytic activity of the manganese compound contained in the product of an ester interchange reaction using the manganese compound as a catalyst is extinguished and subsequently a polycondensation reaction is effected by using an additional catalyst for polymerization. As a result, it has been found that, when phosphoric acid, phosphorous acid or hypophosphorous acid, or a phosphorus compound convertible thereto is added, so that the polymerization catalytic activity of said manganese compound is extinguished, while the concentration of ethylene glycol is controlled to 40% by weight or less, preferably 30% by weight or less based on the total amount of the reaction system, and thereafter a polymerization reaction is effected using as a catalyst amorphous germanium dioxide, there is obtained polyethylene 1,2 - diphenoxyethane - 4,4' - dicarboxylate which is excellent in whiteness, transparency and thermal stability and low in crystallization velocity, and which is free from coloration when molded or spun and heated.

The linear polyethylene 1,2 - diphenoxyethane-4,4'-dicarboxylate of the present invention comprises at least 90 mol percent of repeating units in a molecular chain having the structure of

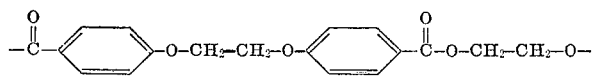

The advantageous effect of the present invention is attained even when the linear polyethyelne 1,2-diphenoxyethane-4,4'-dicarboxylate contains up to 10 mol percent other copolymerization ingredient which is ordinarily employed in a polyester.

Representative examples of manganese compounds to be employed as catalysts for the ester interchange reaction include manganese carbonate; manganese salts of fatty acids such as acidic acid, propionic acid and butyric acid; manganese salts of aromatic acids such as benzoic acid, p-methylbenzoic acid and naphthoic acid; manganese alcoholates of monohydric alcohols such as methyl alcohol, ethyl alcohol and propyl alcohol; and manganese glycolates of dihydric alcohols such as ethylene glycol and propylene glycol. If phosphoric acid, phosphorous acid or hypophosphorus acid, or alkyl or aryl ester thereof is added to the ester interchange reaction product containing above-mentioned manganese compound, the polymerization catalytic activity of the manganese compound is extinguished. The addition of the phosphorus compound is necessarily conducted after completion of the ester interchange reaction and before initiation of the polycondensation reaction, that is, before adding a polymerization catalyst. The amount of the phosphorus compound to be employed is varied depending on the amount of the manganese compound used, and is preferably 300 to 500 mole percent based on the amount of manganese compound. When the ester interchange reaction product containing the manganese compound is reacted with such amount of the phosphorus compound at 230 to 280° C under normal pressure for at least 1 hour, the polymerization catalytic activity of the manganese compound is substantially extinguished.

To the ester interchange reaction product thus treated, according to the present invention, there is added the catalytic amount of amorphous germanium dioxide as a polymerization catalyst, and thereafter the polycondensation reaction is conducted. The amorphous germanium dioxide used in this invention means that which is amorphous when examined by X-ray diffraction, more preferably electron diffraction.

On the other hand, it has also been found that the properties of the polyethylene 1,2-diphenoxyethane-4,4'-dicarboxylate polymer obtained according to this invention varies greatly depending upon the amount of ethylene glycol in the system. In other words, the concentration of ethylene glycol in the system, is one of the most important factors to attain the excellent effect of the present catalyst of manganese compound-phosphorus compound-amorphous germanium dioxide system. Stated illustratively, this catalyst system is liable to cause side reactions such as etherification, thereby resulting in coloration of the polyester obtained. In order to avoid such coloration, the amount of ethylene glycol in the reaction system at the time of adding the amorphous germanium dioxide is necessarily reduced as much as possible. The preferred amount of ethylene glycol is varied not only according to the reaction time but also according to the reaction temperature. Yet, as a result of experiments, it has been found that the suitable amount of ethylene glycol in the system at the time of adding the amorphous germanium dioxide is 40% by weight or less, preferably 30% by weight or less based on the total amount of the reaction system. In this manner, there can be obtained the desired polyester having excellent whiteness and other excellent properties.

In order to clearly show the importance of the amount of ethylene glycol in the reaction system, the following experiment was carried out. 100 parts by weight of 1,2-bis(p - carbomethoxyphenoxy)ethane and 50 parts by weight of ethylene glycol were reacted employing as a catalyst 0.02 parts by weight of manganese acetate at 220° C. for 4 hours to substantially complete the ester interchange reaction, whereupon 0.05 part by weight of phosphorous acid were added to the reaction system, followed by heating to 240° C. to eliminate ethylene glycol remaining unreacted. Thereafter, 0.02 part by weight of amorphous germanium dioxide were added to the system, whereupon the polycondensation was conducted at 280° C. firstly under a pressure of 100 mm. Hg for 1 hour and thereafter under a pressure of 0.1 mm. Hg for 3 hours. The relationship between the amount of ethylene glycol in the system and the viscosity and melting point of the polymer obtained is shown in the following Table 1.

TABLE 1

[Relationship between the amount of ethylene glycol and the properties of the resulting polymer]

| Amount of ethylene glycol (percent by weight) | Z sp/c* | Tm(° C.)** |
|---|---|---|
| 50 | 0.83 | 240 |
| 40 | 0.82 | 242 |
| 30 | 0.85 | 245 |
| 20 | 0.79 | 248 |
| 10 | 0.80 | 250 |
| 0.2 | 0.78 | 250 |

NOTE: * Indicates the reduced viscosity measured by using a 0.1% solution of the polymer in a mixture (3:1) of tetrachloroethane with phenol at 35° C. ** Indicates the melting point measured from the the position of peak at melting of crystals by employing a differential scanning calorimeter.

As apparent from the above results, it can be understood that it is one of the important conditions for obtaining the polymer having excellent properties to add amorphous germanium dioxide to the system at the state in which the concentration of ethylene glycol in the system is low.

1,2-bis(p-carbomethoxyphenoxy) ethane employed as a starting material in the present invention must be of such a quality that the acid value thereof is 0.03 or less, when measured by titrating with 0.1 N of KOH and phenolphthalein an acid component of the solution which is prepared by dissolving with heating 1 g. of 1,2-bis-(para-carbomethoxyphenoxy) ethane in 100 g. of ethyl alcohol. Such acid value cannot be attained satisfactorily by only a few rounds of recrystallization from solvent, for instance, recrystallized from toluene which is ordinarily used, and a number of rounds of recrystallization is required to obtain such high purity as 0.03 or less acid value. If the acid value is more than 0.03, the polymer obtained is poor in thermal stability. The reason for said result is not clear, but is considered to be possibly due to the contamination of a slight amount of impurities at the time when 1,2-bis (para-carbomethoxyphenoxy) ethane is produced. The purification of such contaminated 1,2-bis(p-carbomethoxyphenoxy) ethane can easily be attained by the distillation thereof. The purification by the distillation may be carried out in accordance with the known method. Yet, more preferably, the distillation may be carried out with addition of one or more compounds selected from the group consisting of manganese, calcium, magnesium and sodium salts of phosphoric or phosphorous acid; metal oxides such as calcium oxide, magnesium oxide, sodium oxide and managanese oxide; and metals such as manganese, sodium and calcium in an amount of 0.01 to 0.1% by weight based on the amount of 1,2-bis(p-carbomethoxyphenoxy) ethane, thereby enabling not only the whiteness of the fraction to be improved but also the acid value thereof to be lowered.

In the process of the present invention, the ester interchange reaction and the polycondensation reaction may be carried out in accordance with the known method.

As described, the present invention provides a process for the preparation of polyethylene 1,2-diphenoxyethane-4,4'-dicarboxylate having excellent properties, such as excellent whiteness, transparency and thermal stability, low crystallization velocity and freedom from coloration when molded or spun and heated. Particularly, the crystallization velocity of the polyester obtained according to the present invention is remarkably low, as compared with the polyester prepared by the conventional method. For example, the isothermal crystallization half-period of the polyester of this invention is 5 minutes to 5 minutes 20 seconds at 222° C. What influence the variations in combination of ester interchange catalyst with polycondensation catalyst have on the crystallization velocity of the formed polyethylene 1,2-diphenoxyethane-4,4'-dicarboxylate can be seen from the following Table 2.

The isothermal crystallization half-period referred to herein and throughout the present specification shows the crystallization velocity and is defined as the time required until one-half of a whole crystallization amount is crystallized when a polymer is completely melted in a cell of differential scanning calorimeter (Perkin Elmer, DSC–1 B) at 300° C. for 5 minutes, then the temperature is lowered to a pre-determined constant temperature, for example 222° C., at a velocity of 64° C./min.

TABLE 2

Isothermal crystallization half-periods of polymers formed by using various catalyst systems

| | | | Temperature | | |
|---|---|---|---|---|---|
| | | | 222° C. | 227° C. | 232° C. |
| | | | Half-period | | |
| No. of experiment | Ester interchange catalyst and amount thereof | Polycondensation catalyst and amount thereof | Min., sec. | Min., sec. | Min., sec. |
| 1 | Mn(OOCCH₃)₂ (0.02 part) | Amorphous GeO₂ (0.02 part) | 5'18" | 13'54" | 49'36" |
| 2 | MnCO₃ (0.02 part) | do | 5'10" | 13'48" | 49'40" |
| 3 | Mn(OOC–⟨C₆H₄⟩)₂ (0.02 part) | do | 5'20" | 13'59" | 49'58" |
| 4 | Mn(OH)₂ (0.02 part) | do | 5'05" | 13'50" | 48'58" |
| 5 | Mn(OH)₂ (0.20 part) | do | 5'10" | 13'48" | 48'53" |
| 6 | MnCO₃ (0.02 part) | do | 5'12" | 13'50" | 49'38" |
| 7 | Ca(OOCCH₃)₂ (0.06 part) | (C₄H₉)₂SnO (0.03 part) | 4'33" | 10'57" | |
| 8 | Sr(OOCCH₃)₂ (0.08 part) | (C₄H₉)₂SnO (0.03 part) | 1'30" | 10'57" | |
| 9 | Ba(OOCCH₃)₂ (0.09 part) | (C₄H₉)₂Sn(OCH₃)₂ (0.03 part) | 1'34" | 3'21" | 10'00" |
| 10 | Sr(OOCCH₃)₂ (0.08 part) | (CH₃)₂Sn(OH)₂ (0.03 part) | 1'32" | 3'27" | 10'03" |
| 11 | Ba(OOCCH₃)₂ (0.09 part) | (C₄H₉)₂Sn(OOCCH₃)₂ (0.03 part) | 1'27" | 3'20" | |
| 12 | Zn(OOCCH₃)₂ (0.03 part) | Sb₂O₃ (0.03 part) | 3'15" | 5'48" | |
| 13 | Mn(OOCCH₃)₂ (0.02 part) | Sb₂O₃ (0.03 part) | 2'32" | 7'39" | 16'00" |
| 14 | Pb(OOCCH₃)₂ (0.03 part) | Sb₂O₃ (0.03 part) | 3'39" | 6'48" | 19'00" |

Note.—The experiments of Nos. 1 to 6 correspond to the Examples 1 to 6, respectively. The experiments of Nos. 7 to 14 were carried out in the same manner as in Example 1, with exception that the catalyst system was varied as described in above table.

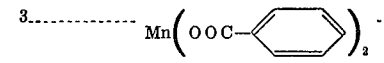

The present inventors have measured the crystallization velocity of polymers which are capable of being formed into molded articles having excellent properties. As a result, it has been found that the polymers having an isothermal crystallization half-period of 5 minutes 5 seconds to 5 minutes 20 seconds at 222° C. will give a molded article with good properties. What influence the variations in combination of ester interchange catalyst with polycondensation catalyst have on properties of the film made of the polymer, such as crystallization half period, transparency and workability is shown in the following Table 3. The workability is dependent on the anti-adhesive property and, is shown, in Table 3, by way of figure at the time of being wound on the roll. The molding operation was conducted using a screw type extruder in such manner that the polymer was extruded at 290° C. under an extruding pressure of 500 kg./cm.², immediately followed by rapid cooling to normal temperature and by biaxial drawing thrice at 80 to 100° C., whereupon the resulting film was subjected to heat treatment at 200° C. for 30 seconds. It will be understood from the Table 3 that the polymer having a crystallization half-period of 5 minutes to 5 minutes 20 seconds at 222° C. exhibits excellent transparency and workability.

TABLE 3

Relationship between the isothermal crystallization half-period and the transparency and workability of film

| No. of experiment | Ester interchange catalyst and amount thereof | Polycondensation catalyst and amount thereof | Viscosity of the polymer | Crystallization half-period at 222° C. (min., sec.) | Transparency | Workability figure at the time of being wound on the roll |
|---|---|---|---|---|---|---|
| 1 | $Mn(OOCCH_3)_2$ | Amorphous $GeO_2$ (0.02 part) | 0.717 | 5'18" | Excellent | Excellent. |
| 2 | $MnCO_3$ (0.02 part) | do | 0.949 | 5'10" | do | Do. |
| 3 | $Mn(OH)_2$ (0.02 part) | do | 0.835 | 5'05" | do | Do. |
| 4 | $Mn(OOCCH_3)_2$ (0.04 part) | $(C_4H_9)SnO$ (0.03 part) | 0.668 | 5'20" | do | Caused to wrinkle. |
| 5 | $Zn(OOCCH_3)_2$ (0.03 part) | $Sb_2O_3$ (0.03 part) | 0.827 | 3'15" | Bad (devitrification) | Good. |
| 6 | $Mg(OOCCH_3)_2$ (0.05 part) | $Sb_2O_3$ (0.03 part) | 0.825 | 2'12" | Devitrification | Do. |
| 7 | $Ba(OOCCH_3)_2$ (0.09 part) | $GeO_2$ (0.03 part) | 0.923 | 1'48" | do | Do. |
| 8 | $Ba(OOCCH_3)_2$ (0.09 part) | $GeO_2$ (0.03 part) | 0.949 | 1'34" | do | Do. |

NOTE.—The experiments of Nos. 1, 2 and 3 correspond to the Examples 1, 2 and 4, respectively. The experiments of Nos. 4 to 8 were carried out in the same manner as in Example 1, with exception that the catalyst system was varied. The viscosity of the polymer is a reduced viscosity measured by using a 0.1% solution of the polymer in a mixture (3:1) of tetrachloroethane with phenol at 35° C.

The polymer obtained according to the present invention can be spun and drawn even at a winding rate of 1000 m./min. to give devitrification-free fibres having excellent tenacity and elongation. The following Table 4 shows the relationship between the isothermal crystallization half-period at 222° C. and the thermal elongation (maximum elongation, times) and transparency of the polymer. The test specimen was prepared by drawing, by means of a hot drawing plate heated to 140° C., the yarn-like polymer which was obtained by spinning the polymer at a spinning temperature of 295° C., a vomitting rate of 17 m./min. and a winding rate of 1000 m./min. The polymers identified by numbers in Table 4 are respectively identical with those identified by the corresponding numbers in Table 3.

TABLE 4

The relationship between the isothermal crystallization half-period at 222° C. and the elongation and transparency of the polymer

| No. of experiment | Crystallization half-period (min., sec.) | Maximum elongation, times | Transparency |
|---|---|---|---|
| 1 | 5'18" | 6.0 | Devitrification free. |
| 2 | 5'10" | 6.0 | Do. |
| 3 | 5'05" | 6.0 | Do. |
| 4 | 5'20" | 5.0 | Do. |
| 5 | 3'15" | 5.0 | Devitrification. |
| 6 | 2'12" | 5.0 | Do. |
| 7 | 1'48" | 4.5 | Do. |
| 8 | 1'34" | 4.5 | Do. |

Illustrative examples are given below only for the purpose of more detailed explanation of the present invention, but not limiting the scope of the present invention. In the examples, the viscosities of the polymers are expressed in terms of a reduced viscosity measured by using a 0.1% solution of the polymer in a mixture (3:1 by weight) of tetrachloroethane with phenol at 35° C.

EXAMPLE 1

0.1 part by weight of manganese phosphate was added to 100 parts by weight of 1,2-bis(p-carbomethoxyphenoxy)ethane, which were purified by distillation at 230° C. under a pressure of 1 mm. Hg. To 100 parts by weight of the resulting solid 1,2-bis(p-carbomethoxyphenoxy)ethane were added 75 parts by weight of ethylene glycol and 0.02 part of manganese acetate as ester interchange catalyst and the ester interchange reaction was conducted at 220° C. for 4 hours while removing methanol formed as a by-product. Thereafter, 0.2 part of triphenyl phosphite were added to the reaction system, followed by heating to 250° C. to distill ethylene glycol in the system for 1 hour, so that the amount of ethylene glycol was reduced to 15% by weight based on the total amount of the system. Subsequently, 0.02 part of amorphous germanium dioxide were added whereupon the heating operation was conducted at 280° C. firstly under a reduced pressure of 100 mm. Hg for 1 hour and thereafter under a reduced pressure of less than 0.1 mm. Hg for 3 hours while removing ethylene glycol formed. There was obtained a solid polymer having a reduced viscosity of 0.717, a whiteness of Grade 5 and a melting point of 248° C. The polymer thus obtained did not show any coloration even after heated at 240° C. for 3 hours in air.

EXAMPLE 2

100 parts by weight of 1,2-bis(p-carbomethoxyphenoxy)ethane, which had been purified by distillation with addition of 0.1 part of metal sodium, and 80 parts by weight of ethylene glycol were charged into an ester interchange vessel, to which 0.02 part by weight of manganese carbonate were added. The ester interchange reaction was carried out at 220° C. for 4 hours while removing methanol formed as a by-product. Thereafter, 0.04 part by weight of phosphorus acid were added to the reaction system, followed by heating at 250° C. to distill ethylene glycol in the system, so that the concentration of ethylene glycol in the system was reduced to 10% by weight. Subsequently, the reaction mixture was transferred into a polymerization vessel and 0.02 part by weight of amorphous germanium dioxide were added thereto, whereupon the heating operation was conducted at 280° C. firstly under a reduced pressure of 100 mm. Hg for 1 hour and thereafter under a reduced pressure of less than 0.1 mm. Hg for 3 hours while removing ethylene glycol formed. There was obtained a solid polymer having a reduced viscosity of 0.949, a whiteness of Grade 5 and a melting point of 249° C. The polymer thus obtained did not show any coloration even after heated at 240° C. for 3 hours.

Comparative Example 1

The same operations as described in Example 1 were conducted with exception that varied ester interchange catalysts, namely, calcium acetate, barium acetate, strontium acetate, lead acetate and magnesium acetate were employed. The results are given in the following Table 5.

acid were employed in place of triphenyl phosphite. There was obtained a solid having a melting point of 249° C.,

TABLE 5

| Polycondensation catalyst | Properties of the product | Ester interchange catalyst | | | | | |
|---|---|---|---|---|---|---|---|
| | | Ca(OAc)₂ (0.06 part) | Mn(OAc)₂ (0.04 part) | Mg(OAc)₂ (0.07 part) | Ba(OAc)₂ (0.09 part) | Sr(OAc)₂ (0.08 part) | Pb(OAc)₂ (0.08 part) |
| Sb₂O₃ (0.03 part) | Reduced viscosity | 0.784 | 1.037 | | 0.854 | 0.934 | |
| | Transparency | Bad | Bad | | Bad | Bad | |
| | Coloration by heat | XX | XX | | XX | XX | |
| | Melting point, ° C | 249 | 245 | | 249 | 249 | |
| | Whiteness, grade | 3 | 3 | | 3 | 3 | |
| Amorphous GeO₂ (0.02 part) | Reduced viscosity | 0.784 | 0.668 | 0.867 | 0.949 | 0.717 | 0.724 |
| | Transparency | Bad | Good | Good | Bad | Bad | Good |
| | Coloration by heat | O | O | XX | ⊙ | ⊙ | XX |
| | Melting point, ° C | 250.5 | 248 | 248 | 249 | 250 | 245 |
| | Whiteness, grade | 4 | 4 | 4 | 5 | 5 | 3 |

The transparency was determined as follows; the polymer was spun at 290° C. and subsequently drawn on a hot drawing plate heated to 140° C. in accordance with the known method, whereupon the examination was made on whether or not a devitrification occurred. The yarn with devitrification and the yarn entirely free from devitrification were judged as "Bad" and "Good," respectively.

The coloration by heat was determined as follows: the polymer was heated at 240° C. for 3 hours in air, whereupon the coloration was examined. "⊙" means non-coloration, "XX" means coloration and "O" means slight coloration.

The melting point was measured by means of a differential scaning calorimeter.

The degree of whiteness was expressed in terms of any of five grades 1 to 5. Grade 5 means complete whiteness, Grade 4 means extremely slightly yellowish coloration, Grade 3 means slightly yellowish coloration and Grade 2 means yellowish coloration and Grade 1 means deeply yellowish coloration.

Comparative Example 2

The same operation as described in Example 1 was repeated with exception that 1,2 - bis(p-carbomethoxyphenoxy)ethane recrystalized from toluene to have an acid value of 0.08 was employed. There was obtained a solid having a whiteness of 4, a transparency of "Bad" and a melting point of 248° C. The thermal coloration thereof was "XX."

EXAMPLE 3

The same operation as described in Example 1 was repeated with exception that 0.02 part by weight of manganese benzoate were employed in place of manganese acetate. There was obtained a white solid having a whiteness of 5, a transparency of "Good" and a melting point of 248° C. The solid did not show any coloration even after heated at 240° C. for 3 hours in air.

EXAMPLE 4

The same operation as described in Example 2 was repeated with exception that 0.02 part by weight of manganese hydroxide were employed in place of manganese carbonate. There was obtained a white solid having a whiteness of 4, a transparency of "Good" and a melting point of 248° C. The solid did not show any coloration even after heated at 240° C. for 3 hours in air.

EXAMPLE 5

The same operation as described in Example 1 was repeated with exception that 0.2 part by weight of manganese hydroxide were employed in place of manganese acetate. There was obtained a solid having a melting point of 250° C., a reduced viscosity of 0.798 and a whiteness of 5. The solid did not show any coloration even after heated at 240° C. for 3 hours in air.

EXAMPLE 6

The same operation as described in Example 2 was repeated with exception that 0.05 part of phosphorous acid were employed in place of triphenyl phosphite. There was obtained a solid having a melting point of 249° C., a reduced viscosity of 0.825 and a whiteness of 5. The solid did not show any coloration even after heated at 240° C. for 3 hours in air.

Comparative Example 3

The same operation as described in Example 5 was repeated with exception that 1,2-bis(p-carbomethoxyphenoxy) ethane recrystallized from toluene to have an acid value of 0.08 was employed. There was obtained a solid of a whiteness of 4, a transparency of "Bad" and a melting point of 249° C. The degree of coloration by heat was "XX."

EXAMPLE 7

The polymer obtained in Example 1 was subjected to extrusion at 310° C. at an extrusion rate of 0.5 g./min. and wound at a winding rate of 2000 m./min. The yarn thus obtained was drawn on a plate heated to 140° C. There were obtained fibres having a tenacity of 5.0 g./denier, an elongation of 20.5%, a refractive index of 0.161 and a density of 1.363 g./cm.³. No devitrification was observed.

EXAMPLE 8

The polymer obtained in Example 2 was extruded on a cold roll by an extruder having a dieround of 40 mm. in diameter, a dieslit of 350 mm. long and 0.5 mm. wide at a die temperature of 280° C. and wound at a rate of 5 m./min. to obtain a transparent film with a thickness of 100μ. The film thus obtained was biaxially drawn by four times at 120° C. There was obtained a wrinkle-free film having a transparency of "Good," a yield strength of 2,690 kg./cm.², an elongation of 6.4% and a Young's modulus of 80,000 kg./cm.². The heat compression at 180° C. for 1 minute was less than 1.0%.

What is claimed is:

1. A process for the preparation of moldable polyethylene 1,2-diphenoxyethane-4,4'-dicarboxylate resin, which comprises:

reacting (A) 1,2-bis(p-carbomethoxyphenoxy) ethane having an acid value of 0.03 or less with (B) ethylene glycol, in the presence of a catalytic amount of a manganese compound as an ester interchange catalyst, said manganese compound being selected from the group consisting of manganese carbonate, manganese salts of fatty acids, manganese salts of aromatic acids, manganese alcoholates of monohydric alcohols and manganese glycolates of dihydric alcohols, whereby to effect an ester interchange reaction; then adding to the reaction system a phosphorus compound in an amount in the range of 300 to 500 mole percent based on the amount of the manganese compound in said reaction system to substantially extinguish the catalytic activity of the manganese compound, said phosphorus compound being selected from the group consisting of phosphoric acid, phosphorous acid, hypophosphorous acid and phenyl esters thereof;

establishing the ethylene glycol concentration of the reaction system to be not in excess of 40% by weight based on the total weight of the reaction system; and then adding to the reaction system a catalytic amount of amorphous germanium dioxide as a condensation catalyst and carrying out a polycondensation reaction to obtain moldable polyethylene 1,2-diphenoxyethane-4,4'-dicarboxylate resin.

2. A process as claimed in claim 1, wherein said manganese compound is selected from the group consisting of manganese carbonate, manganese acetate, manganese benzoate and manganese hydroxide.

3. A process for the preparation of moldable polyethylene 1,2-diphenoxyethane-4,4'-dicarboxylate resin, which comprises:

reacting (A) 1,2-bis(p-carbomethoxyphenoxy) ethane having an acid value of 0.03 or less with (B) ethylene glycol, in the presence of a catalytic amount of a manganese compound as an ester interchange catalyst, said manganese compound being selected from the group consisting of manganese carbonate, manganese salts of fatty acids, manganese salts of aromatic acids, manganese alcoholates of monohydric alcohols and manganese glycolates of dihydric alcohols, whereby to effect an ester interchange reaction; then adding to the reaction system a phosphorus compound in an amount in the range of 300 to 500 mole percent based on the amount of the manganese compound in said reaction system to substantially extinguish the catalytic activity of the manganese compound, said phosphorus compound being selected from the group consisting of triphenyl phosphite and phosphorus acid;

establishing the ethylene glycol concentration of the reaction system to be not in excess of 40% by weight based on the total weight of the reaction system; and then adding to the reaction system a catalytic amount of amorphous germanium dioxide as a condensation catalyst and carrying out a polycondensation reaction to obtain moldable polyethylene 1,2-diphenoxyethane-4,4'-dicarboxylate resin.

4. A process as claimed in claim 1 wherein after the addition of the phosphorus compound, the reaction thereof with the manganese compound is effected at 230 to 280° C. under normal pressure for at least 1 hour.

References Cited

UNITED STATES PATENTS

| | | | |
|---|---|---|---|
| 2,465,150 | 3/1949 | Dickson | 260—47 C UX |
| 2,503,251 | 4/1950 | Edwards et al. | 260—47 C UX |
| 2,951,060 | 8/1960 | Billica | 260—75 |
| 3,161,710 | 12/1964 | Turner | 260—75 |
| 3,377,320 | 4/1968 | Zoetbrood | 260—75 |

OTHER REFERENCES

Korshak: Polyesters, published New York, N.Y., 1965, Pergamon Press, pp. 153 and 154.

WILLIAM H. SHORT, Primary Examiner

L. P. QUAST, Assistant Examiner

U.S. Cl. X.R.

260—473 G; 264—176 F